THERMIONIC VALVE OSCILLATOR

Filed May 21, 1946

Inventor
J. A. B. Davidson
By Glascock Downing & Seebold
Attys.

Patented Dec. 4, 1951 2,577,235

UNITED STATES PATENT OFFICE 2,577,235

THERMIONIC VALVE OSCILLATOR

James Alexander Bremner Davidson, Beckenham, England, assignor to Muirhead and Company Limited, Beckenham, England Application May 21, 1946, Serial No. 671,203
In Great Britain June 5, 1945

9 Claims. (Cl. 250—36)

This invention relates to thermionic valve oscillators of the resistance capacity type.

In British Patent Specification No. 497,148 there is described and claimed an oscillator comprising an amplifier which gives zero, or nearly zero phase displacement, over a range of frequencies, and a filter connected between the output and input of the amplifier, such filter consisting effectively of a non-resonant combination of resistance and reactance elements, giving a phase displacement which is zero, or nearly zero, at the desired oscillation frequency and which varies in opposite sense for frequencies on either side of this value.

In practice the amplifier usually consists of two valves coupled together with a normal resistance capacity coupling between the anode of one valve and the grid of the other. Such a coupling necessarily introduces an undesirable phase displacement at low frequencies with the result that the frequency of oscillation is no longer solely dependent on the resistance and reactance elements of the tuning filter.

The object of the invention is to provide a resistance capacity oscillator in which errors in the generated frequencies due to such undesirable phase displacement are avoided.

The invention consists in a thermionic valve oscillator comprising a first and a second valve connected in cascade in which the output of the second valve is connected to the input of the first valve by means of a non-resonant tuning filter comprised of resistance and capacitance elements, and of a similar character to that of the filter coupling the output of the first valve to the input of the second valve.

Such an arrangement can be made to generate sinusoidal oscillations, the frequency of which are substantially determined by the resistance and capacitance elements of the non-resonant tuning filters even at very low frequencies. The resistance elements or the capacitance elements or both types of elements may be made variable and they may be ganged together.

The fraction of the voltage which is fed from either or both the valves to their corresponding filters may be made variable for the purpose of controlling regeneration. Alternatively, the fraction of the voltage fed from either or both the filters to their corresponding valves may be made variable for the purpose of controlling regeneration.

Preferably the amplifying stages comprised by the valves are arranged to have equal gain, and the two filters are proportioned so that both of them have zero phase shift and identical attenuations at the desired frequency of oscillation. When these conditions are satisfied and the system is made to generate sinusoidal oscillations the potentials appearing between the anodes of the two valves and the common supply point to the valves are equal in magnitude but opposite in phase, so that an output which is balanced with respect to the common supply point of the valves may be obtained between the anodes of the two valves.

If the potentials appearing between the two anodes and the common supply point of the valves are opposite in phase but unequal in magnitude owing to maladjustment, an output which is balanced with respect to the common supply point of the valves may be obtained by tapping off a fraction of the larger anode voltage, the tapping point being chosen so that the voltage appearing between this point and the common supply point of the valves is equal to the potential appearing between the other anode and the common supply point of the valves, and connecting the output between this other anode and the tapping point.

The invention will be described further in detail and by way of example with reference to the accompanying drawings, in which.

Figures 1, 2, 3, 4, 5, 6, 7:
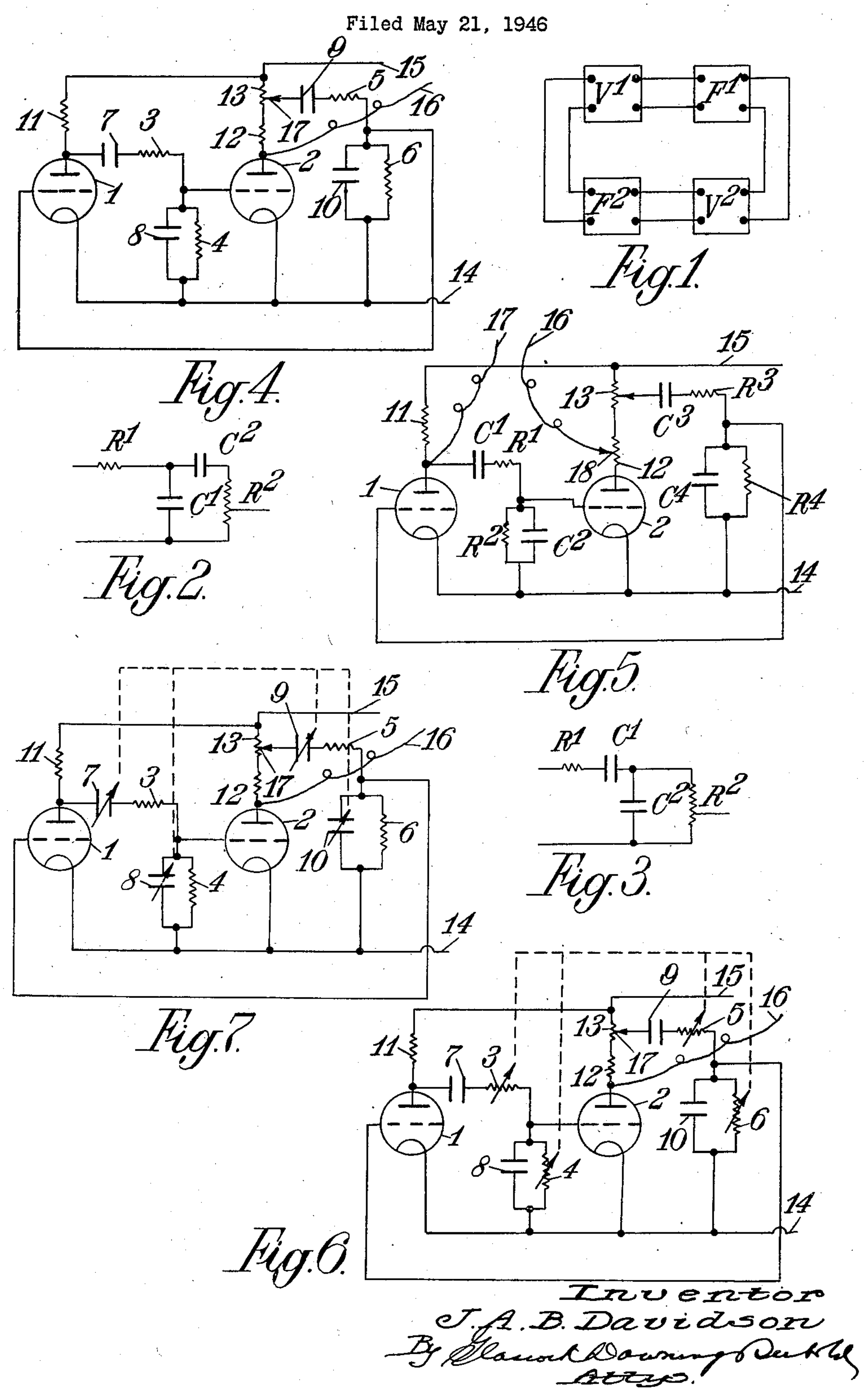
Figure 1 is a diagrammatic representation of the essential elements of an oscillator in accordance with the invention.
Figures 2 and 3 represent two types of filter networks suitable for the purpose of the invention.
Figure 4 is a wiring diagram of an oscillator within the scope of the invention.
Figure 5 is a wiring diagram of an oscillator within the scope of the invention and having an output which can be balanced with respect to the common supply point of the valves.

Figure 6 indicates how the resistances of Figure 4 may be variable and ganged together. Figure 7 indicates how the condensers of Figure 4 may be variable and ganged together.

Referring to Figure 1, $V_1$ and $V_2$ denote thermionic valves, and $F_1$ and $F_2$ denote filter networks consisting of a non-resonant combination of resistance and capacitance elements giving a phase displacement which is zero or nearly zero at the desired oscillation frequency, and which varies in opposite sense for frequencies on either side of this valve.

Referring to Figures 2 and 3, $R_1$ and $R_2$ are resistance elements and $C_1$ and $C_2$ are capacitance elements. The tapping points shown on resistances $R_2$ are optional and they may be made adjustable. An oscillator in accordance with the invention will employ two filters, which may both be similar to the one shown in Figure 2 or both similar to the one shown in Figure 3, or alternatively one of the filters may be of the type shown in Figure 2 and the other may be of the type shown in Figure 3. The four resistance elements of the two filters may be made variable and ganged together, or the four capacitance elements of the two filters may be made variable and ganged together. In the filters shown in Figures 2 and 3 the frequency of zero phase shift is given by $$f=\frac{1}{2\pi\sqrt{R_1R_2C_1C_2}}$$

Referring to Figure 4, which represents the circuit of an oscillator in accordance with the invention, the anode of valve 1 is connected to the common high tension lead 15 through the resistance 11. The anode of valve 1 is connected through the condenser 7 in series with resistance 3 to the grid of valve 2, which is connected to the common negative lead 14 through the resistance 4 in parallel with the condenser 8. The anode of the valve 2 is connected to the common high tension lead through the resistance 12 in series with the resistance 13. A tapping point 17 on the resistance 13 is connected through the condenser 9 in series with the resistance 5 to the grid of valve 1 which is connected to the common negative lead 14 through the resistance 6 in parallel with the condenser 10. From the anode of valve 2 there may be taken a lead 16 to the grid of a power amplifier functioning as an output amplifier.

The resistances 3, 4, 5 and 6 may be ganged together and made variable, and the condensers 7, 8, 9 and 10 may be ganged together and made variable in steps. (See Figures 6 and 7 respectively.)

The regeneration of the circuit as a whole may be controlled by adjusting the position of the tapping point 17 on the resistance 13.

The valves 1 and 2 are shown as triodes for simplicity of illustration, but it will be understood that any suitable valves may be used.

Referring to Figure 5, which represents an oscillator similar to that shown in Figure 4 but having an output which is balanced with respect to the common supply point of the valves, one side of the output is taken from a tapping point 18 on the resistance 12, and the other side of the output is taken from the anode of valve 1. The filters $C_1R_1R_2C_2$ and $C_3R_3C_4R_4$ are so proportioned that the product of the terms $C_1C_2R_1R_2$ is equal to the product of the terms $C_3R_3C_4R_4$, and so both filters have zero phase shift at the frequency of oscillation $$f=\frac{1}{2\pi\sqrt{R_1R_2C_1C_2}}$$

and the voltage between the anode of valve 1 and the lead 14 is opposite in phase to the voltage between the anode of valve 2 and the lead 14.

The values of the resistances 11, 12 and 13 are chosen so that the voltage between the anode of valve 2 and the lead 14 is somewhat greater than the voltage between the anode of the valve 1 and the lead 14. By adjusting the tapping point 18 the voltage between this point and the lead 14 can be made equal in magnitude to the voltage between the anode of valve 1 and the lead 14, so that the voltage between the leads 16 and 17 is balanced with respect to the lead 14.

I claim:

1. Thermionic valve oscillator comprising a first and a second valve connected in cascade a non-resonant tuning filter connecting the output of the first valve to the input of the second valve, said non-resonant tuning filter including resistance and capacitance elements giving a phase displacement which is zero or nearly zero at the desired oscillation frequency, and which varies in opposite sense for frequencies on either side of this value and a non-resonant tuning filter connecting the output of the second valve to the input of the first valve, the second non-resonant tuning filter including resistance and capacitance elements and of a similar character to that of the filter coupling the output of the first valve to the input of the second valve.

2. The invention in accordance with claim 1, and means for adjusting the voltage output of at least one of said filters for controlling regeneration.

3. The invention in accordance with claim 1, and means for adjusting the voltage input to at least one of said filters for controlling regeneration.

4. The invention in accordance with claim 1, in which a capacitance element of at least one of said filters is a variable capacitance.

5. The invention in accordance with claim 1, in which a resistance element of at least one of said filters is a variable resistance.

6. The invention in accordance with claim 1, in which each of said filters includes a variable capacitance element, and unicontrolled means for varying said capacitance elements concurrently.

7. The invention in accordance with claim 1, in which each of said filters includes a variable resistance element, and unicontrolled means for varying said resistance elements concurrently.

8. An oscillator in accordance with claim 1 in which the respective gains of the stages constituted by said valves are equal at the oscillation frequency, and in which said tuning filters have equal attenuation and zero phase shift at said frequency, and means for deriving an output from a point between the outputs of said respective valves.

9. An oscillator in accordance with claim 1 in which both of said filters have zero phase shift at the frequency of oscillation, a common anode supply for said valves, and means for deriving an output connected between the anode of one of said valves and a tapping point between the anode of the other valve and said common anode supply.

JAMES ALEXANDER BREMNER DAVIDSON.

REFERENCES CITED

The following references are of record in the file of this patent:

UNITED STATES PATENTS

| Number | Name | Date |
|---|---|---|
| 2,229,205 | Braaten | Jan. 21, 1941 |
| 2,268,872 | Hewlett | Jan. 6, 1942 |

FOREIGN PATENTS

| Number | Country | Date |
|---|---|---|
| 489,849 | Great Britain | Aug. 4, 1938 |
| 497,148 | Great Britain | Dec. 12, 1938 |